(12) United States Patent
Graupner et al.

(10) Patent No.: US 8,024,106 B2
(45) Date of Patent: Sep. 20, 2011

(54) METHOD FOR REGULATING A COMBUSTION PROCESS OF AN INTERNAL COMBUSTION ENGINE WITH EXHAUST-GAS RECIRCULATION

(75) Inventors: Olaf Graupner, Köfering (DE); Hong Zhang, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 70 days.

(21) Appl. No.: 12/097,337

(22) PCT Filed: Sep. 8, 2006

(86) PCT No.: PCT/EP2006/066174
§ 371 (c)(1),
(2), (4) Date: Sep. 26, 2008

(87) PCT Pub. No.: WO2007/071463
PCT Pub. Date: Jun. 28, 2007

(65) Prior Publication Data
US 2009/0151696 A1  Jun. 18, 2009

(30) Foreign Application Priority Data

Dec. 16, 2005  (DE) .......................... 10 2005 060 350

(51) Int. Cl.
*B60T 7/12* (2006.01)
*G05D 1/00* (2006.01)
*G06F 7/00* (2006.01)
*G06F 17/00* (2006.01)

(52) U.S. Cl. ................... 701/108; 123/399; 123/568.21; 60/605.2

(58) Field of Classification Search ............. 123/568.11, 123/568.21, 399, 403; 60/605.2; 701/103, 701/108
See application file for complete search history.

(56) References Cited

U.S. PATENT DOCUMENTS

| 6,009,862 | A | 1/2000 | Doorenbos et al. |
| 6,539,714 | B1* | 4/2003 | Wang ............................. 60/598 |
| 6,637,382 | B1* | 10/2003 | Brehob et al. ............... 123/25 J |
| 2002/0124838 | A1* | 9/2002 | Wild et al. ............... 123/568.16 |
| 2003/0177765 | A1* | 9/2003 | Wang ............................. 60/602 |
| 2003/0182049 | A1* | 9/2003 | Bale et al. ..................... 701/108 |
| 2003/0192516 | A1* | 10/2003 | Brunemann et al. ...... 123/568.12 |
| 2003/0192517 | A1 | 10/2003 | Bina |
| 2004/0045541 | A1 | 3/2004 | Akao |
| 2005/0287034 | A1* | 12/2005 | Wills et al. ...................... 422/52 |
| 2007/0012040 | A1* | 1/2007 | Nitzke et al. ................. 60/605.2 |
| 2010/0236531 | A1* | 9/2010 | Shimizu et al. ............... 123/564 |

FOREIGN PATENT DOCUMENTS

CN    1472552 A    2/2004
(Continued)

OTHER PUBLICATIONS

International Search Report; PCT/EP2006/066174; pp. 10, Nov. 27, 2006.

*Primary Examiner* — Willis Wolfe, Jr.
*Assistant Examiner* — Anthony L Bacon
(74) *Attorney, Agent, or Firm* — King & Spalding L.L.P.

(57) ABSTRACT

In a method for regulating a combustion process of an internal combustion engine with exhaust-gas recirculation, which can be operated with a variable air/fuel ratio, and a fresh-air flow and a recirculated exhaust-gas flow, both the fresh air and the recirculated exhaust-gas flow are metered. The combustion process of an internal combustion engine with exhaust-gas recirculation is regulated, wherein the method makes precise determination of the exhaust-gas recirculating rate possible with a low fault tolerance.

6 Claims, 1 Drawing Sheet

FOREIGN PATENT DOCUMENTS

| | | |
|---|---|---|
| DE | 19934508 A1 | 2/2000 |
| DE | 10158249 | 7/2003 |
| DE | 10158249 A1 | 7/2003 |
| EP | 1076924 B1 | 9/2003 |
| EP | 1498594 | 7/2004 |
| EP | 1548255 | 12/2004 |
| EP | 1498594 A1 | 1/2005 |
| EP | 1548255 A1 | 6/2005 |

* cited by examiner

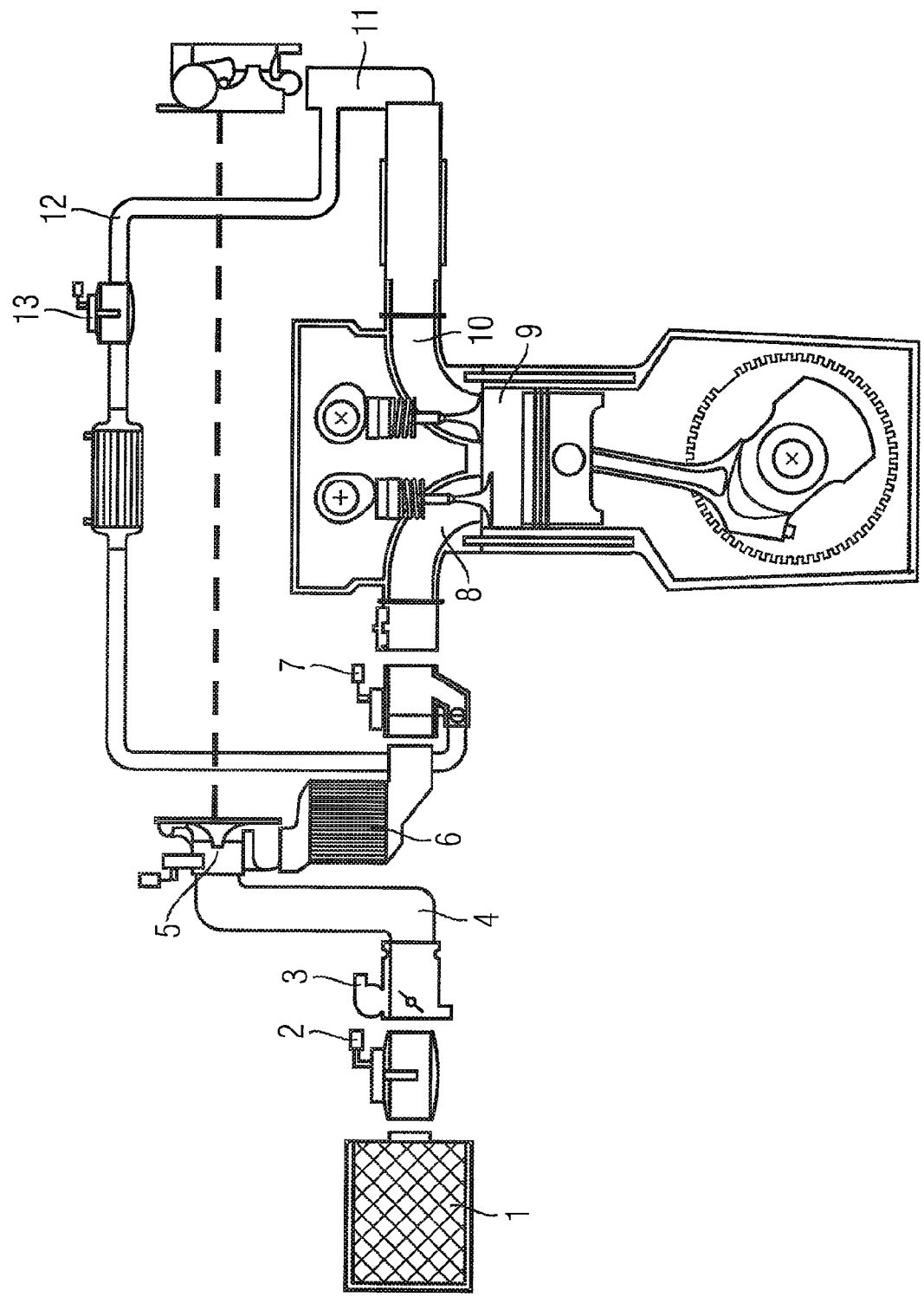

METHOD FOR REGULATING A COMBUSTION PROCESS OF AN INTERNAL COMBUSTION ENGINE WITH EXHAUST-GAS RECIRCULATION

CROSS-REFERENCE TO RELATED APPLICATION

This application is a U.S. national stage application of International Application No. PCT/EP2006/066174 filed Sep. 8, 2006, which designates the United States of America, and claims priority to German application number 10 2005 060 350.5 filed Dec. 16, 2005, the contents of which are hereby incorporated by reference in their entirety.

TECHNICAL FIELD

The invention relates to a method for regulating a combustion process of an internal combustion engine with exhaust gas recirculation, which can be operated with a variable air/fuel ratio, with a fresh air flow and a recirculated exhaust gas flow.

BACKGROUND

Exhaust gas recirculation has become increasingly significant in recent years, particularly for internal combustion engines. Its positive impact on exhaust gas behavior means that exhaust gas recirculation has an important key role with regard to meeting and complying with the stringent exhaust gas standards required now and in the near future. For internal combustion engines in particular, which are operated with a high proportion of air, which means that the proportion of nitrogen oxides ($NO_x$) in the exhaust gas increases significantly, this technology allows a reduction of up to 80% of nitrogen oxides to be achieved.

To satisfy exhaust gas limit values, the mixture (fresh air/fuel ratio) in the combustion chamber must be set so that an optimal compromise between $NO_x$ and particle emissions results. To this end the control unit of the internal combustion engine changes the fresh air/fuel ratio, for example by changing the EGR rate or adjusting the electronic throttle control (ETC), so that the required exhaust gas composition is achieved.

To regulate a combustion engine, e.g. a charged diesel engine, to achieve optimal emissions in particular, it is extremely important to have precise knowledge of as many operating parameters of the engine system as possible. For a combustion engine with exhaust gas recirculation such an operating parameter is for example the exhaust gas recirculation mass flow, i.e. the mass flow of exhaust gas emitted by the combustion engine, which is fed by way of an exhaust gas recirculation line to a mixing point, where the exhaust gas is mixed with fresh air taken in, in order to feed the resulting fresh air/exhaust gas mixture to the combustion chambers of the combustion engine. The so-called exhaust gas recirculation rate, i.e. the quotient of the fresh air mass flow taken in and the exhaust gas recirculation mass flow, is also important for compliance with exhaust gas requirements.

Precise metering of the exact quantity of air and fuel has become increasingly important for lean-operation, low-emission combustion engines due to the high emission intensity. A common means of reducing the emissions of current engines (gas and diesel engines) here too is exhaust gas recirculation in particular, which reduces the proportion of oxygen in the intake air, thereby reducing nitrogen oxide emissions. It is disadvantageous here that as the oxygen content decreases, combustion tends to cause more soot to form. This results in the known "particle/nitrogen oxide tradeoff" with diesel engines, which refers to a mutual dependency of nitrogen oxides and particle emissions as a function of the exhaust gas recirculation rate. Precise setting of the recirculation rate during operation is therefore extraordinarily important for compliance with emission limits.

With current regulation models either the quantity of fresh air or the quantity of recirculated exhaust gas is generally regulated, with the result that the respective other mass flow is set according to the dependency:

$$\text{Fresh air mass+exhaust gas mass=absorption capacity of engine} \quad (1)$$

In this process a given absorption capacity is generally set at the respective load point according to equation (1), in other words the following relationship results:

$$\text{Fresh air mass+exhaust gas mass}=K1 \text{ (constant)} \quad (2)$$

This relationship also applies in principle to charged engines and to throttled operation. The only difference compared with pure intake operation here is the fact that the absorption behavior can be set according to the known gas law:

$$p \cdot V = mRT \quad (3),$$

where
p is pressure,
V is volume,
m is mass,
R is the gas constant and
T is temperature,
in other words the mass or volume flow is a function of the intake pipe pressure. In principle equation (2) still applies, as the target intake pipe pressure also represents a fixed calibration variable and the target absorption capacity is therefore predetermined uniquely for each load point.

In practice this means that one of the two mass flows is regulated according to equation (2) by a precontrol target value, which is lower than the absorption capacity, and the remaining volume is filled by the respective other flow. This means that all the tolerances influencing the constant K1 have a negative impact on this filling quantity and therefore ultimately on the accuracy of the metered ratio of fresh air and recirculated exhaust gas. The essential parameters influencing K1 result from the production tolerances for the manufacture of the engine and air supply system, the change in operation, e.g. due to deposits in the intake system, in the case of charged engines due to the overall tolerance of the charging process (turbocharger, sensor system, regulator and/or precontroller, etc.) and in the case of throttling due to throttling accuracy.

In the case of current turbo-diesel engines the fresh air value and charging pressure are generally predetermined, with the latter frequently only being proposed and therefore being relatively inaccurate. The exhaust gas mass flow is set automatically and is determined from the difference between the target absorption capacity K1 and the current fresh air value as well as all the tolerances influencing K1. The negative impact of these tolerances on emission behavior is considerable here.

SUMMARY

A method for regulating a combustion process of an internal combustion engine with exhaust gas recirculation can be specified, which allows precise determination of the exhaust gas recirculation rate with low error tolerance.

According to an embodiment, a method for regulating a combustion process of an internal combustion engine with exhaust gas recirculation, which can be operated with a variable air/fuel ratio, and a fresh air flow and a recirculated exhaust gas flow, may comprise the step of metering both the fresh air flow and the recirculated exhaust gas flow.

According to a further embodiment, a measured variable may be determined respectively for the fresh air flow and/or for the recirculated exhaust gas flow. According to a further embodiment, the measured variable for the fresh air flow and/or for the recirculated exhaust gas flow may be determined directly by a mass and/or volume flow meter. According to a further embodiment, the method may replace the use of a pressure sensor. According to a further embodiment, the measured variable for the fresh air flow and/or for the recirculated exhaust gas flow may be determined indirectly by way of a pressure sensor at a throttle point. According to a further embodiment, an intake pressure sensor may be used as the pressure sensor. According to a further embodiment, a turbo speed signal may be used to determine pressure and the charging and/or exhaust gas counter-pressure is calculated from the measured turbo speed. According to a further embodiment, a turbo speed sensor may be used to determine the turbo speed. According to a further embodiment, a calculated value from the engine controller may be used to determine pressure. According to a further embodiment, when the method is deployed in turbo engines, these may be operated in the lower load range along the pump limit of the compressor. According to a further embodiment, a throttle facility for the intake air or an adjustable charging facility or a variable intake facility or a variable valve drive may be used to set the absorption capacity.

BRIEF DESCRIPTION OF THE DRAWINGS

Further advantages and embodiments of the invention are described below with reference to an exemplary embodiment and with reference to the schematic drawing, in which:

FIG. 1 shows a diagram of the internal combustion engine with exhaust gas recirculation.

DETAILED DESCRIPTION

The method according to various embodiments for regulating a combustion process of an internal combustion engine with exhaust gas recirculation, which can be operated with a variable air/fuel ratio, and a fresh air flow and a recirculated exhaust gas flow, is characterized in that both the fresh air flow and the recirculated exhaust gas flow are metered specifically, in that a measured variable is used both for the fresh air flow and the recirculated exhaust gas flow. This measured variable can be obtained directly by means of a mass or volume flow meter or indirectly, for example by way of a pressure loss over a known throttle point. This pressure loss can either be measured directly or can be derived, for example from a speed signal from the turbocharger, from which the charging and/or exhaust gas counter-pressure can be calculated, or from a value calculated in the engine controller. This gives the absorption capacity as the resulting variable, which is set for example by corresponding setting of the charging pressure or slight throttling. For modern engines further settings are possible, for example the use of a variable valve drive, or the use of switching valves or tubes, etc.

The method according to various embodiments makes it possible to replace the conventionally used pressure sensor, since the pressure can be determined with knowledge of the mass flows from equation (3). The use of an additional pressure sensor can however be advantageous, if the charging pressure is to be acquired for safety or onboard diagnostic (OBD) purposes, to check the accuracy of the method according to various embodiments with an additional measurement value.

Alternatively the exhaust gas mass flow can also be determined by way of a pressure drop over the exhaust gas recirculation section. This requires either two absolute pressure sensors, one of which can be an intake pressure sensor, or one differential pressure sensor.

Turbo engines are operated in the lower load range along the pump limit of the compressor, which represents a limiting variable for regulating the absorption capacity. Since throttling would not be desirable here in practice, it is not possible to set the absorption capacity correspondingly. In practice the regulating characteristics of the described strategy would be limited so that the charger continues to be operated in the lower range along the pump limit. As soon as the characteristics of the charger allow an additional air excess, the regulator becomes active. The advantage of the method according to various embodiments is that only the individual tolerances of the air and/or exhaust gas flows have a negative effect on measuring accuracy for oxygen in the intake air here and these can be metered very precisely with the latest sensor and actuator systems. All the tolerances of the air system, like the above-mentioned parameters influencing K1 and in particular here the change in the engine over its operating life, are automatically regulated out. As modern emissions legislation also requires permanent compliance with emission limits by engines in operation, this is a significant advantage. Assuming a sufficiently precise determination of the air and/or exhaust gas flows, it is possible to achieve a clear reduction in overall metering accuracy and therefore an improvement in emission behavior with this strategy.

FIG. 1 shows a schematic diagram of an exemplary embodiment of an internal combustion engine with exhaust gas recirculation. Air flows by way of an air filter 1, an air mass sensor 2, a throttle valve 3 and an intake pipe 4 into a compressor 5 of a turbocharger. The compressed air then flows by way of a charging air cooler 6 and an exhaust gas recirculation valve 7 into an inlet 8, which leads to the combustion chamber 9. The exhaust gases now pass through the outlet 10 into the exhaust gas tract 11, where some of them are fed back by way of the exhaust gas recirculation system 12 with exhaust gas mass sensor 13 to the exhaust gas recirculation valve 7 or are directed to the compressor of the turbocharger.

The present invention advantageously creates a method for regulating a combustion process of an internal combustion engine with exhaust gas recirculation, which allows precise determination of the exhaust gas recirculation rate with low error tolerance.

The invention claimed is:

1. A method for regulating a combustion process of an internal combustion engine with exhaust gas recirculation, which can be operated with a variable air/fuel ratio, a fresh air flow and a recirculated exhaust gas flow, said method comprising the steps of:
measuring the fresh air flow with an air mass sensor;
measuring a rotational speed of a turbocharger;
calculating a pressure of the recirculated exhaust gas flow based on the measured rotational speed of the turbocharger;

determining the recirculated exhaust gas flow based on the calculated pressure of the recirculated exhaust gas flow; and adjusting the variable air/fuel ratio based on the measured fresh air flow from the air mass sensor and the determined recirculated exhaust gas flow.

2. The method according to claim 1, wherein the rotational speed of the turbocharger is determined by a turbo speed signal from a rotational speed sensor on the turbocharger.

3. The method according to claim 1, wherein the variable air/fuel ratio is adjusted with a throttle valve in the fresh air flow.

4. A system for regulating a combustion process of an internal combustion engine with exhaust gas recirculation, which can be operated with a variable air/fuel ratio, a fresh air flow and a recirculated exhaust gas flow, comprising:
 a flow sensor for measuring the fresh air flow;
 a rotational speed sensor on a turbocharger for measuring a rotational speed of the turbocharger; and
 a device for:
  calculating a pressure of the recirculated exhaust gas flow based on the measured rotational speed of the turbocharger;
  determining the recirculated exhaust gas flow based on the calculated pressure of the recirculated exhaust gas flow; and
  adjusting the variable air/fuel ratio based on the measured fresh air flow from the air mass sensor and the measured determined recirculated exhaust gas flow.

5. The system according to claim 4, wherein the measured fresh air flow is determined with a pressure sensor at the device for adjusting the variable air/fuel ratio.

6. The system according to claim 5, wherein the device for adjusting the variable air/fuel ratio is a throttle valve in the fresh air flow.

* * * * *